United States Patent [19]

Ichikawa

[11] Patent Number: 4,938,565
[45] Date of Patent: Jul. 3, 1990

[54] THIN-FILM TRANSISTOR ARRAY USED FOR LIQUID-CRYSTAL DISPLAY DEVICE

[75] Inventor: Shouji Ichikawa, Tokyo, Japan

[73] Assignee: NEC Corporation, Tokyo, Japan

[21] Appl. No.: 234,357

[22] Filed: Aug. 19, 1988

[30] Foreign Application Priority Data

Aug. 21, 1987 [JP] Japan .............................. 62-208718

[51] Int. Cl.⁵ .............................................. G02F 1/13
[52] U.S. Cl. .................................... 350/332; 350/333
[58] Field of Search ................................ 350/332, 333

[56] References Cited

U.S. PATENT DOCUMENTS 4,666,252 5/1987 Yaniv et al. ......................... 350/333
4,709,992 12/1987 Ueno ................................ 350/333 X
4,781,438 11/1988 Noguchi ........................... 350/333 X

FOREIGN PATENT DOCUMENTS 0081621 5/1984 Japan .................................... 350/333

Primary Examiner—Stanley D. Miller
Assistant Examiner—Huy K. Mai
Attorney, Agent, or Firm—Helfgott & Karas

[57] ABSTRACT

A thin-film transistor array used for a liquid crystal display device uses a plurality of transistor structures as switches between a video signal line and a pixel electrode which is controlled with a control signal applied through a scanning line, each of transistor structures having a plurality of thin-film transistors connected in series and parallel and having gates commonly connected to the same scanning line. An example of each transistor structure has four thin-film transistors and has a parallel connection of two sets of series connections of two thin-film transistors or a series connection of two sets of parallel connections of two thin-film transistors.

7 Claims, 3 Drawing Sheets

THIN-FILM TRANSISTOR ARRAY USED FOR LIQUID-CRYSTAL DISPLAY DEVICE

BACKGROUND OF THE INVENTION

1. Field of the Invention:

The present invention relates to a thin-film transistor array used in a liquid-crystal display device, and more particularly, to an improvement for decreasing the defective ratio of the thin-film transistor.

2. Description of the Related Art:

In recent years, with a progress of office automation, many attentions have been paid to the research and development of plane display devices such as liquid crystal display devices. The liquid crystal display device is constituted by interposing liquid crystal between a common electrode board and a thin-film transistor array board. The thin-film transistor array board has a matrix of thin-film transistors each of which accompanies a pixel electrode. For displaying a clear image, especially clear characters, a large number of pixel electrodes are required in a small area together with the accompanied thin-film transistors.

The thin film transistors are formed by covering a gate electrode with amorphous silicon layer via an insulating film and disposing source and drain electrodes on the amorphous silicon layer on both sides of the gate electrode. A video signal and a scan signal are respectively applied to the drain electrode and the gate electrode to sequentially apply the video signal to the pixel electrodes. An image is displayed by changing the light transparency of the liquid crystal on the pixel electrodes.

Here, it is very difficult to form a large number of thin-film transistors without any defective ones. Even if the thin-film transistors are formed with using the most advanced processing technology, it is hard to decrease the number of the defective transistors less than five among 250×250 thin-film transistors. Such defective transistors deteriorates the image quality. Especially, the displayed characters are made hard to be read.

Measures in the prior art for decreasing the number of defective thin-film transistors were usages of two series-connected or parallel-connected thin-film transistors in place of a single thin-film transistor, as shown in FIGS. 1(a) and 1(b).

According to the first measure shown in FIG. 1(a), a pair of thin-film transistors, one having a gate 1-1, a drain 1-2 and a source 1-3 and the other having a gate 2-1, a drain 2-2 and a source 2-3 are connected in series between a video signal line 6 and a pixel electrode 7. Both the gates 1-1 and 2-1 are connected to the same scanning line 5. The second measure shown in FIG. 1(b) connects a pair of thin-film transistors, one having a gate 11-1, a drain 11-2 and a source 11-3 and the other having a gate 12-1, a drain 12-2 and a source 12-3, in parallel between a video signal line 16 and a pixel electrode 17. Both the gates 11-1 and 12-1 are connected to the same scanning line 15.

There are, however, two types of defects. First type keeps a continuous "off" state. The measure shown in FIG. 1(a) is not effective against such first type of defect. Second type keeps a continuous "on" state. The other measure shown in FIG. 1(b) is not effective against such second type of defect. Therefore, the measures in the prior art are not effective to those two types of defects and do not effectively decrease the number of defective pixels in displayed image.

SUMMARY OF THE INVENTION

It is, therefore, a major object to provide a thin-film transistor array having a decreased number of defective transistor structures which can be formed with the present manufacturing technology.

It is another object to provide a liquid crystal display having a decreased number of defective pixels which are based on defects of thin-film transistors used therein.

According to the present invention, there is provided a thin-film transistor array having a large number of transistor structures in each of which a serially connected first and second thin-film transistors and other serially connected third and fourth thin-film transistors are connected in parallel, gates of the first to fourth thin-film transistors being connected to receive the same signal. The connecting point between the first and second thin-film transistors may be connected to the connecting point between the third and fourth thin-film transistors. The serial-parallel connection may be interposed between a video signal line and a pixel electrode on a thin-film transistor array board in a liquid crystal display device.

The transistor structure in the thin-film transistor array of the present invention does not lose its transistor action, even if some of the composed thin-film transistors are defective. That is, if a first and/or second thin-film transistor is the first type of defect keeping "off" state, the series connection of the third and fourth thin-film transistors keeps the switching operation of the transistor structure. In a case of a third and/or fourth thin-film transistor keeps "off" state, the series connection of the first and second thin-film transistors keeps the switching operation of the transistor structure. On the other hand, if the first and/or third thin-film transistor is the second type of defect keeping "on" state, the second and/or fourth thin-film transistor keeps switching operation of the transistor structure. In this manner, the transistor structure of the present invention is hard to be affected from the defective thin-film transistors composed therein. In a case of using the transistor structures of the present invention in a liquid crystal display device, the defective ratio of pixels is improved to $4 \times 10^{-4}$. This ratio means that almost no defect appears in a liquid crystal display device.

BRIEF DESCRIPTION OF THE DRAWINGS

The above and further objects, features and advantages of the present invention will become more apparent from the following described description taken in conjunction with the accompanying drawings, wherein.

DETAILED DESCRIPTION OF THE PREFERRED EMBODIMENTS

Figure 1A:
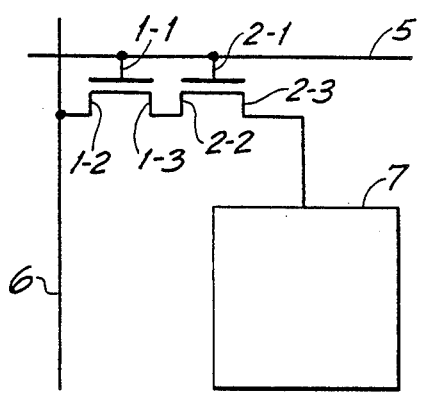
FIGS. 1(a) and 1(b) are equivalent circuits of one pixel in a thin-film transistor array board of a liquid crystal display device in prior arts.
Figure 2A:
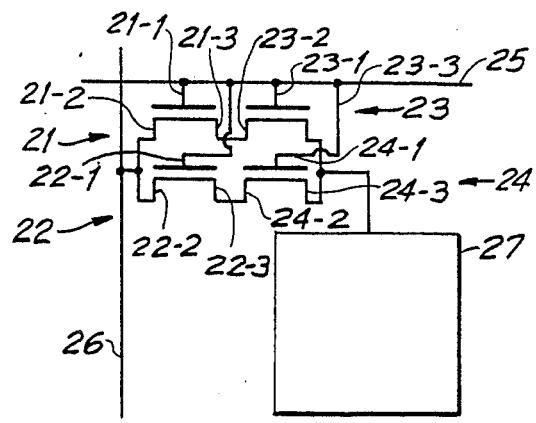
FIGS. 2(a) and 2(b) are equivalent circuit and a plane view of one pixel in a thin-film transistor array board of a liquid crystal display device according to a first preferred embodiment of the present invention.
Figure 1B:
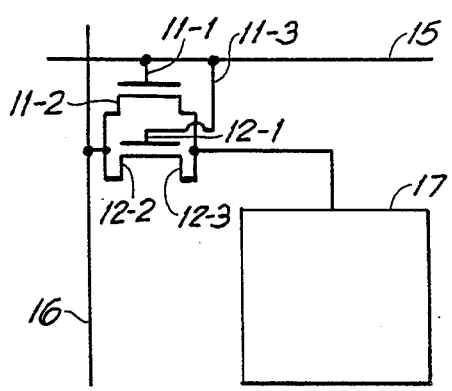
Figure 2B:
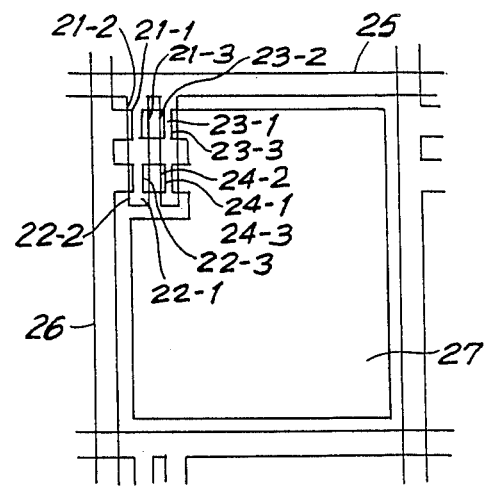
Figure 2C:
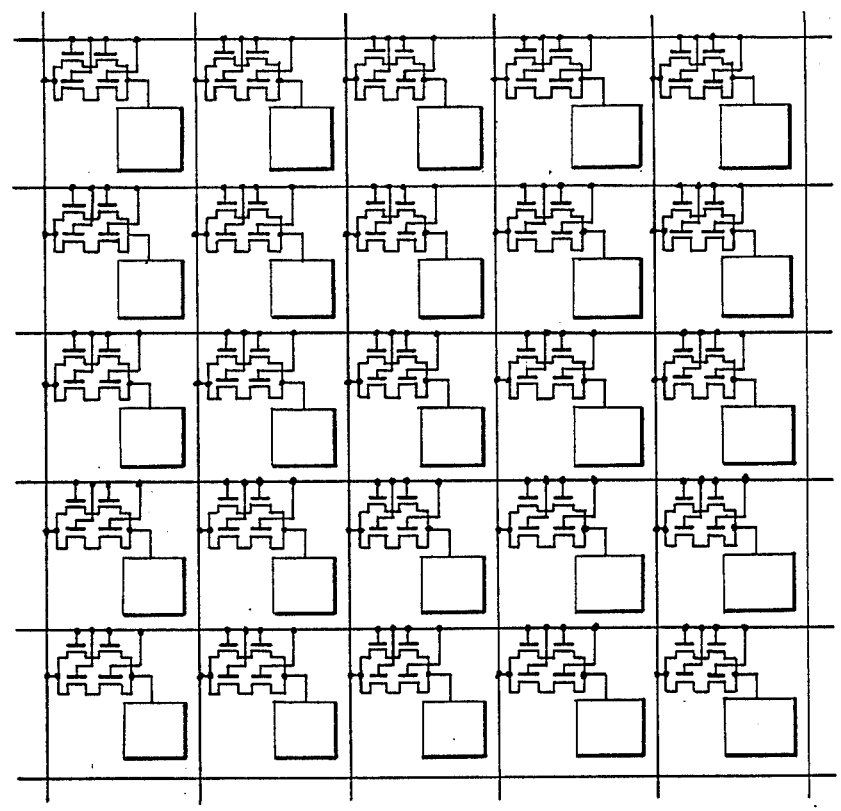
FIG. 2(c) shows an array of transistor structures with a plurality of pixel electrodes disposed on an insulating board in correspondence with FIG. 2(a)

The first preferred embodiment of the present invention uses two sets of serially connected two thin-film transistors, as shown in FIGS. 2(a) and 2(b). A large number of pixels are formed on a thin-film transistor array board in a matrix form. An example of the pixel matrix is 400×640 and the area of the array board is 180 mm×240 mm. A liquid crystal display device is constructed by covering a common electrode board upon the thin-film transistor array board via a small interval and pouring liquid crystal in to the small interval between the thin-film transistor array board and the common electrode board.

The thin-film transistor array board has an insulating transparent board on which a plurality of parallely arranged video signal lines 26 and a plurality of parallely disposed scanning lines 25 which perpendicularly cross the video signal lines 26. At each crossing point of the scanning line 25 and the video signal line 26, there is provided a pixel composed of a transistor structure and a pixel electrode 27. One transistor structure is made of four thin-film transistors 21 to 24. Gates 21-1 to 24-1 of all the four thin-film transistors 21 to 24 are commonly connected to the scanning line 25. Drains 21-2 and 22-2 are connected to the same video signal line 26. Source 21-3 and drain 23-2 are connected to form a series connection of the thin-film transistors 21 and 23. Similarly, source 22-3 and drain 24-2 are connected to form another series connection of the thin-film transistors 22 and 24. Drains 23-3 and 24-3 are connected to the same pixel electrode 27. Namely, the series connection of the thin-film transistors 21 and 23 are another series connection of the thin-film transistors 22 and 24 are connected in parallel with each other between the video signal line 26 and the pixel electrode 27.

Each of the thin-film transistors 21 to 24 is formed in an inverted-staggered type. The gates 21-1 to 24-1 are formed by evaporating chromium having a thickness of 1000 Å with a sputtering process in an argon atmosphere and by selectively etching the chromium film to leave gate patterns. Successively, silicon nitride film is depositted on the gate patterns and their surroundings with a thickness of 3,000 Å by a plasma chemical-vapor deposition method. Thereafter, a non-doped amorphous silicon film and a phosphorus-doped amorphous silicon film are depositted on the silicon nitride film with thickness of 3,000 Å and 300 Å by a plasma chemical-vapor deposition method. Upon the phosphorus-doped amorphous silicon film, another chromium is evaporated with a thickness of 1,500 Å by sputtering in an atmosphere of argon and then selectively etched to form sources and drains. A deposition of ITO (indium tin oxide) film having a thickness of 1,000 Å is followed. The ITO film is etched to form the pixel electrodes 27 connecting the sources 23-3 and 24-3. Finally, the phosphorus-doped amorphous silicon between the drains 21-2 to 24-2 and the sources 21-3 to 24-3 is etched away.

According to the first preferred embodiment, even if one of the series connected two thin-film transistors are defective, the transistor structure formed of four thin-film transistors keeps its switching function. In more detail, if the thin-film transistor 21 and/or 23 is defective of the first type which keeps a continuous "off" state, the other series connection of thin-film transistors 22 and 24 achieves the switching function of the transistor structure. Similarly, if the thin-film transistor 22 and/or 24 is defective to keep the continuous "off" state, the series connection of thin-film transistors 21 and 23 maintains the switching function of the transistor structure. Furthermore, if one of the series connected thin-film transistors 21 and 23 and/or one of the series connected thin-film transistors 22 and 24 is defective of the second type which keeps a continuous "on" state, the other one of the series connected thin-film transistors 21 and 23 and the other one of the series connected thin-film transistors 22 and 24 maintain the switching function of the transistor structure. Thus, there is very few chance in which the transistor structure loses its switching function. In fact, according to our experimental trial, there was no defective pixel in a liquid crystal display device having 400×600 pixels, compared to 19 defective pixels in a prior art liquid crystal display device using a single thin-film transistor in each pixel.

Figure 3C:
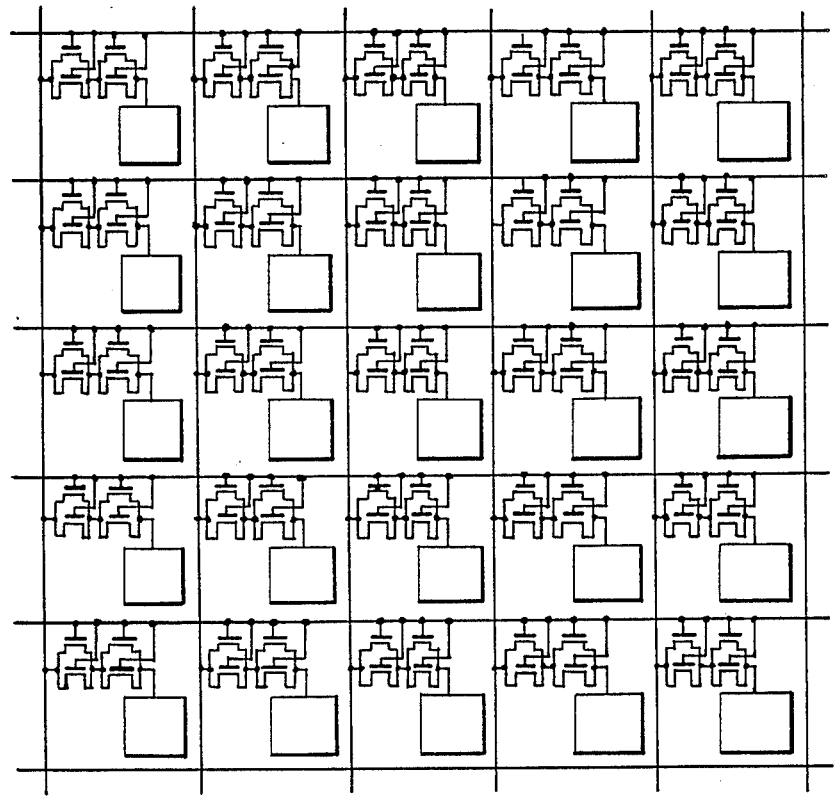
FIG. 3(c) shows an array of transistor structures with a plurality of pixel electrodes in correspondence with FIG. 3(a).
Figure 3A:
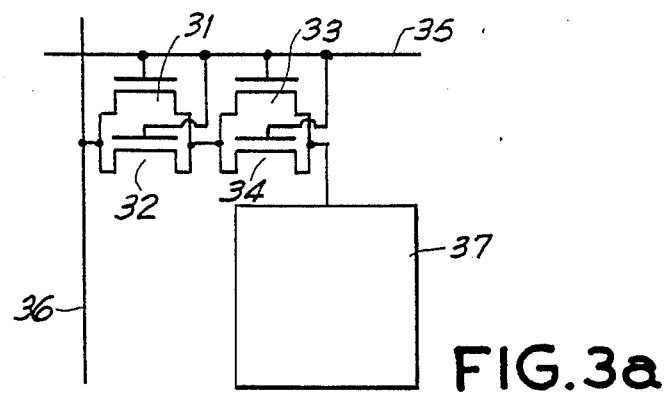
FIGS. 3(a) and 3(b) are equivalent circuit and a plane view of one pixel in a thin-film transistor array board of a liquid crystal display device according to a second preferred embodiment of the present invention.
Figure 3B:
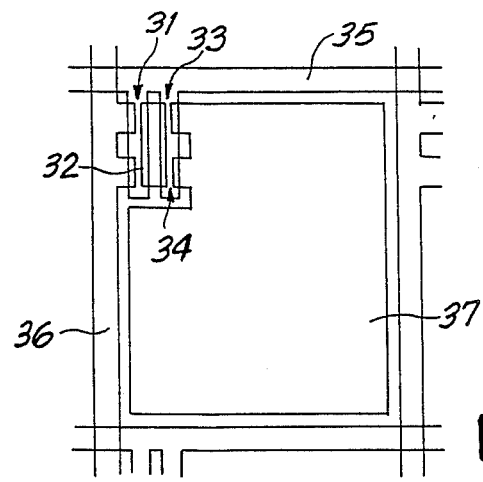

According to the second preferred embodiment of the present invention shown in FIGS. 3(a) and 3(b), two sets of parallel-connected thin film transistors are connected in series between the video signal line 36 and the pixel electrode 37. All the gates of the four thin-film transistors 31 to 34 are connected a scanning line 35. In other words, connecting points between thin-film transistors 21 and 23 and between 22 and 24 in FIGS. 2(a) and 2(b) are mutually connected. A large number of pixels composed of four thin-film transistors 31 to 34 and a pixel electrode are formed on a thin-film transistor array board in a liquid crystal display device in a matrix form.

Drains of the thin-film transistors 31 and 32 are connected to the video signal line 36. Sources of the thin-film transistors 31 and 32 are connected to drains of the thin-film transistors 33 and 34. Sources of the thin-film transistors 33 and 34 are connected to the pixel electrode 37. In this manner, a parallel connection of the thin-film transistors 31 and 32 and another parallel connection of the thin-film transistors 33 and 34 are connected in series between the video signal line 36 and the pixel electrode 37.

In this second preferred embodiment, if any one of four thin-film transistors 31 to 34 is defective of the first type keeping "off" state, remaining thin-film transistors maintain the switching function of the transistor structure. Especially, if one of the parallely connected thin-film transistors keeps a continuous "off" state, the other thin-film transistor achieves the switching function of the parallel connection. If one or two thin-film transistors in one parallel connection are defective of the second type which keeps "on" state, the other parallel connection achieves the switching function of the transistor structure. In this manner, similar to the first preferred embodiment, the transistor structure of the second preferred embodiment has very few chance to lose its switching function.

As above-mentioned, the transistor structure of the present invention does not lose its switching function, if some of the composed thin-film transistors are defective. Therefore, by using the transistor structure of the present invention as a switching element connected to a pixel electrode in a thin-film transistor array board, there is provided a liquid crystal display device having very few defective pixels.

What is claimed is:

1. A thin-film transistor array formed on an insulating board having a plurality of electrical signal applying first lines and a plurality of electrical signal applying second lines orthogonally crossing said first lines, the array comprising a plurality of transistor structures each formed in a region of said insulating board corresponding to each one crossing point of said first lines and said second lines; and a plurality of electrical elements connected in the array so as to use an electrical signal applied from one of said first and second lines through one of said transistor structures, each of said transistor structures including a plurality of thin-film transistors each having source, drain and gate electrodes, said thin-film transistors in each one of said transistor structures being respectively connected so that at least one parallel connection and at least one series connection of electrical paths between the source and the drain electrodes of said transistors are formed.

2. A thin-film transistor array as claimed in claim 1, wherein each one of said transistor structures is formed of first, second, third and fourth thin-film transistors, and wherein an electrical path between the source and the drain electrodes of said first and third thin-film transistors is connected in series to form a first series connection and the electrical paths between the source and the drain electrodes of said second and fourth thin-film transistors are connected in series to form a second series connection, said first and second series connections being connected with each other in parallel.

3. A thin-film transistor array as claimed in claim 2, wherein a connecting point of said first and third thin-film transistors in said first series connection is connected to another connecting point of said second and fourth thin-film transistors in said second series connection.

4. A thin-film transistor array as claimed in claim 1, wherein each one of said transistor structures includes first, second, third and fourth thin-film transistors, and wherein the electrical paths between the source and the drain electrodes of said first and second thin-film transistors are connected in parallel to form a first parallel connection, and the electrical paths between the source and the drain electrodes of said third and fourth thin-film transistors are connected in parallel to form a second parallel connection, said first and second parallel connections being connected to each other in series.

5. A thin-film transistor array board comprising:
an insulating board;
a plurality of video signal lines formed on said insulating board in parallel with one another;
a plurality of control signal lines formed on said insulating board in parallel with one another and to orthogonally cross said video signal lines;
a plurality of transistor structures formed on said insulating board, one of said transistor structures being disposed at respective crossing points of said video signal lines with said control signal lines, each of said transistor structures including an input portion connected to one of said video signal lines, an output portion, a control signal receiving portion connected to one of said control signal lines, and a plurality of thin-film transistors each having source, drain and gate electrodes, all of said gate electrodes being commonly connected to said control signal receiving portion, said thin-film transistors in each one of said transistor structures being connected so that a series connection and a parallel connection of electrical paths between the source and drain electrodes of said thin-film transistors are formed; and
a plurality of pixel electrodes formed on said insulating board, each of said pixel electrodes being connected to said output portion of one of said transistor structures.

6. A thin-film transistor array board as claimed in claim 5, wherein at least one of said transistor structures includes first, second, third and fourth thin-film transistors, said first and third thin-film transistors being connected in series to form a first series connection, said second and third thin-film transistors being connected in series to form a second series connection, and said first and second series connections being connected in parallel between said input and output portions of said transistor structures.

7. A thin-film transistor array board as claimed in claim 5, wherein at least one of said transistor structures include first, second, third and fourth thin-film transistors, said first and second thin-film transistors being connected in parallel to form a first parallel connection, said third and fourth thin-film transistors being connected in parallel to form a second parallel connection, and said first and second parallel connections being connected in series between said input and output portions of said transistor structures.

* * * * *